(12) United States Patent
Robison

(10) Patent No.: US 6,193,241 B1
(45) Date of Patent: Feb. 27, 2001

(54) TOOL DRIVE SYSTEM

(75) Inventor: Troy Robison, Ingleside, IL (US)

(73) Assignees: Thomas R. Vigil, Barrington; Gary Sebastian, Lake Zurich, both of IL (US); part interest to each (*) Notice: Subject to any disclaimer, the term of this patent is extended or adjusted under 35 U.S.C. 154(b) by 0 days.

(21) Appl. No.: 09/375,580

(22) Filed: Aug. 17, 1999

Related U.S. Application Data

(63) Continuation-in-part of application No. 09/317,231, filed on May 24, 1999.

(51) Int. Cl.[7] ................. B23B 31/107; B23B 31/12

(52) U.S. Cl. .................. 279/137; 279/60; 279/62; 279/22; 279/145; 279/904; 279/128; 408/226; 81/438

(58) Field of Search ....................... 279/143–145, 279/137, 128, 22, 24, 30, 9.1, 71, 75, 902, 904, 905, 60–65; 81/125, 438, 439; 7/158, 165; 408/226, 239 A

(56) References Cited

U.S. PATENT DOCUMENTS

| | | | |
|---|---|---|---|
| 768,396 | * | 8/1904 | North ................... 279/62 |
| 1,035,495 | * | 8/1912 | Szeitl .................. 279/62 |
| 2,387,339 | * | 10/1945 | Meyer .................. 279/61 |
| 2,522,217 | * | 9/1950 | Fischer et al. ........... 81/438 |
| 5,193,824 | * | 3/1993 | Salpaka ................. 279/60 |
| 5,540,453 | * | 7/1996 | Sakamaki ............... 279/60 |
| 5,921,562 | * | 7/1999 | Robison ................ 279/145 |

FOREIGN PATENT DOCUMENTS

3841638 * 6/1990 (DE) .................. 408/226

* cited by examiner

Primary Examiner—Steven C. Bishop
(74) Attorney, Agent, or Firm—Thomas R. Vigil

(57) ABSTRACT

The tool drive system for use with a chuck having a throughbore including an outer bore portion for receiving a tool or tool holder and an inner bore portion constructed to receive and be mounted on an outer end of a motor shaft of a power tool comprises: an insert received in the inner bore portion; structure for preventing rotation of the insert relative to the chuck; structure on the insert for engaging an inner end of a tool or tool holder; and a mechanism for holding the tool or tool holder against axial movement relative to the insert.

15 Claims, 7 Drawing Sheets

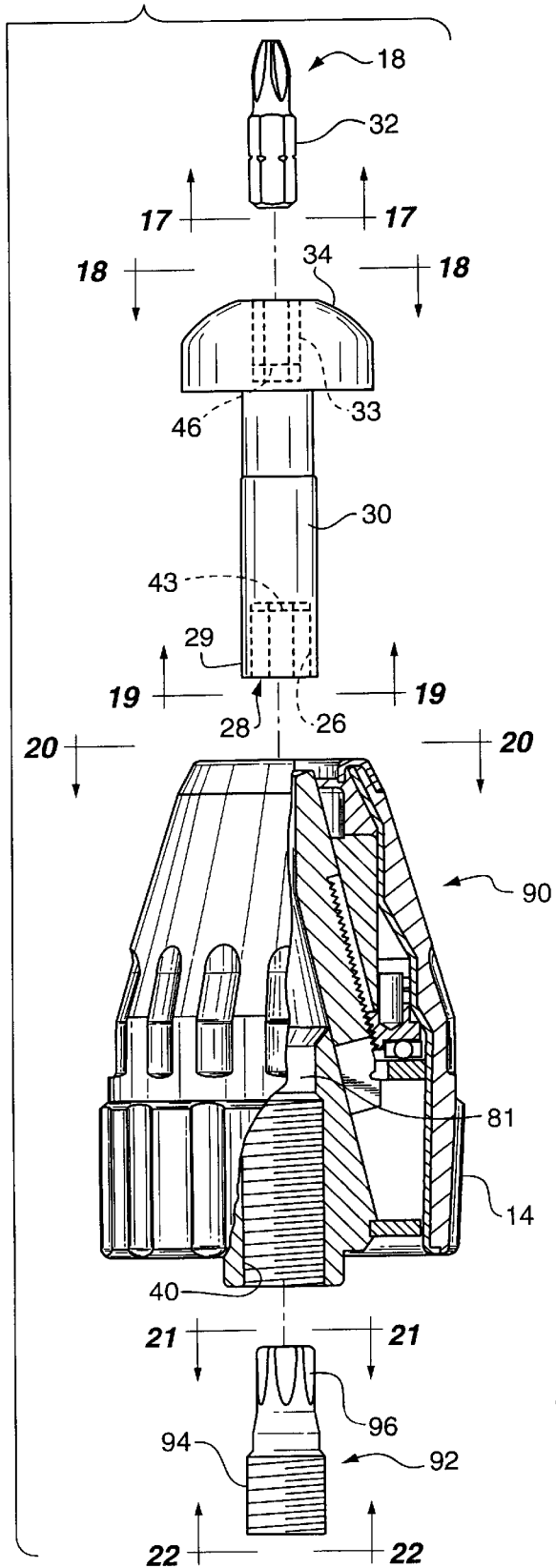
FIG. 16
FIG. 17
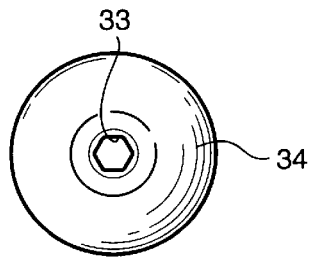
FIG. 18
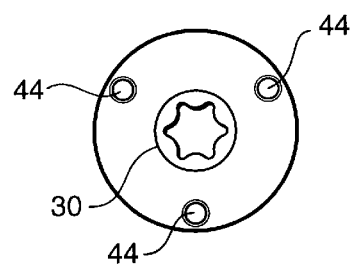
FIG. 19
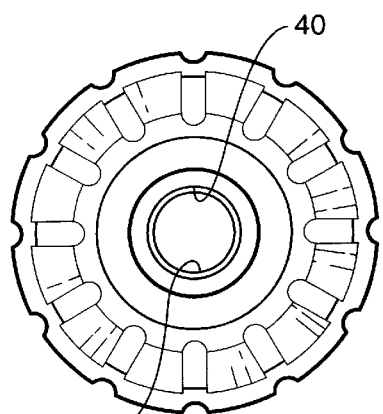
FIG. 20
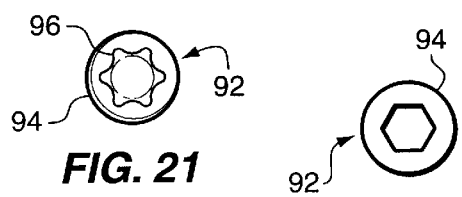
FIG. 21
FIG. 22

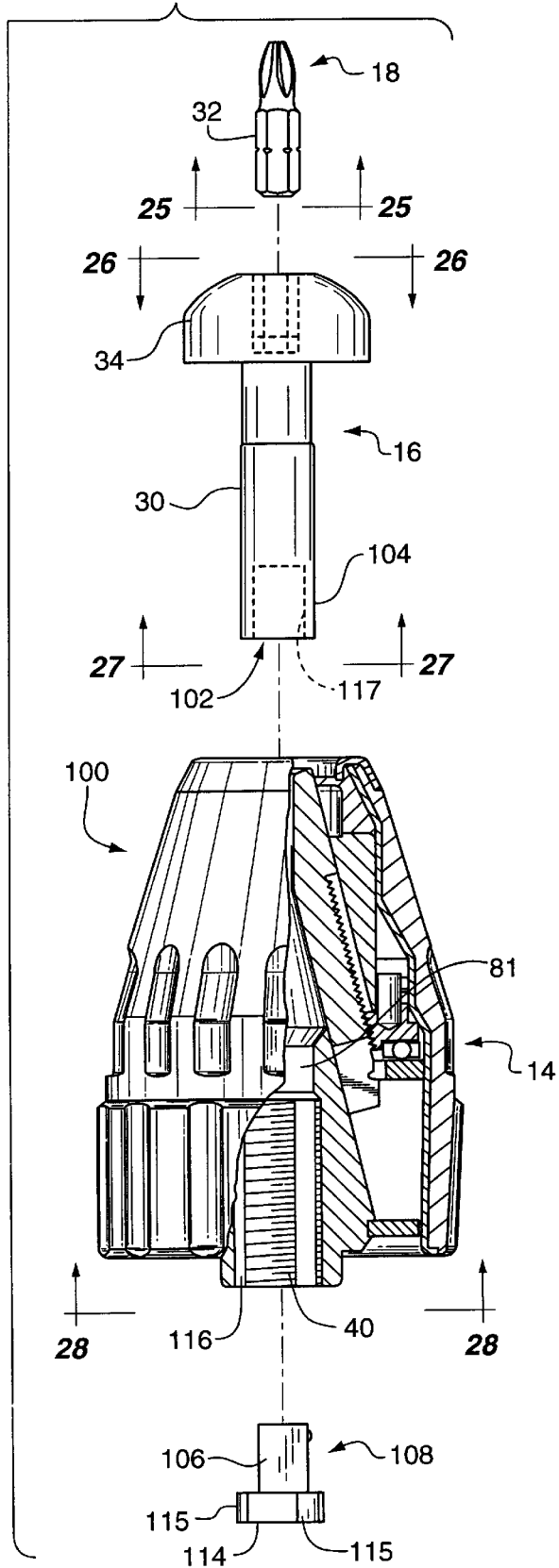
FIG. 23
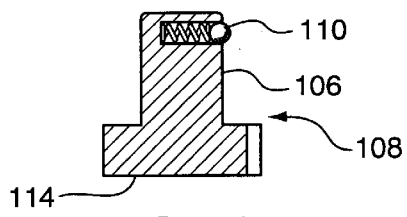
FIG. 24
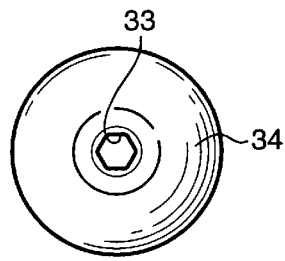
FIG. 25
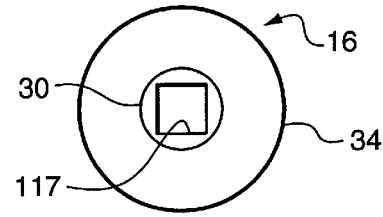
FIG. 26
FIG. 27
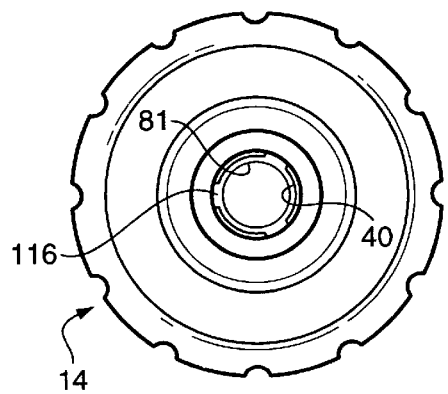
FIG. 28

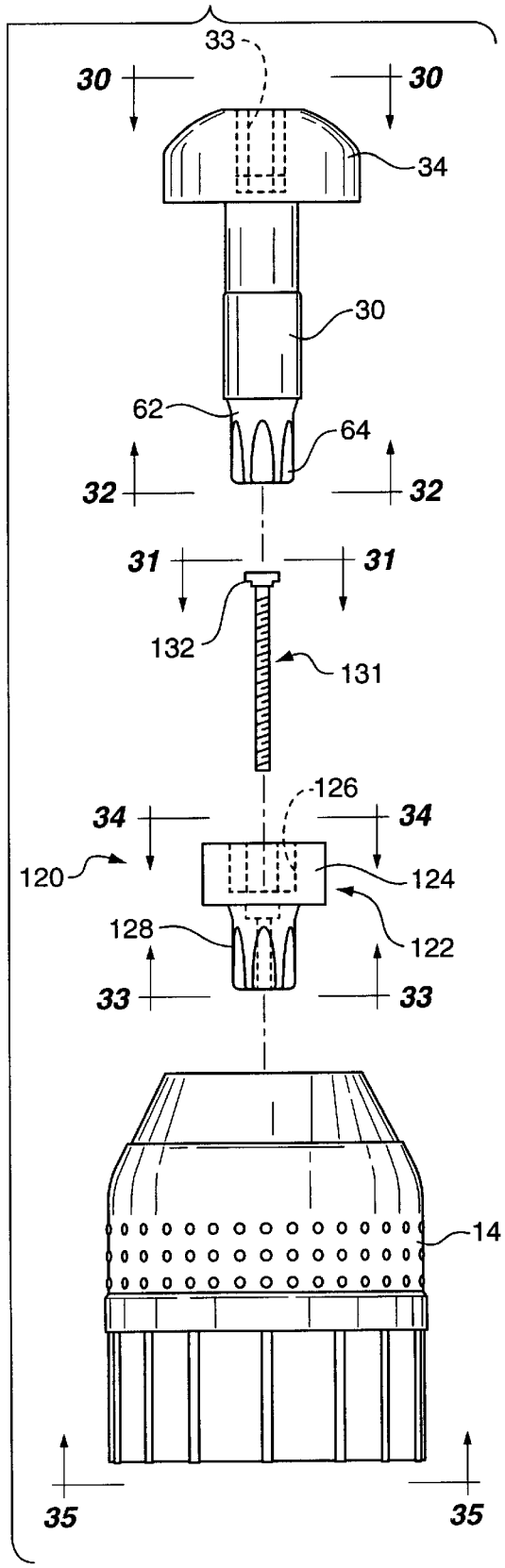
FIG. 29
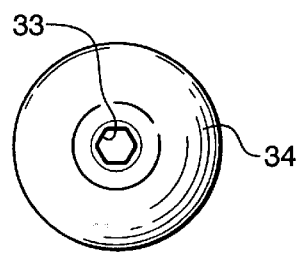
FIG. 30
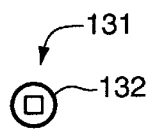
FIG. 31
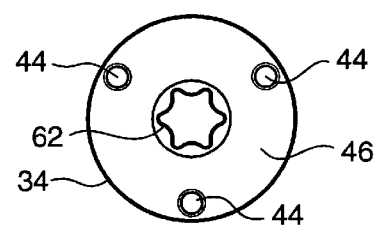
FIG. 32
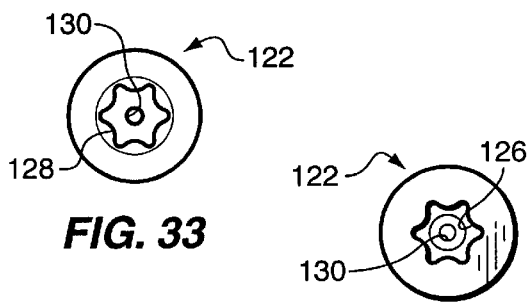
FIG. 33  FIG. 34
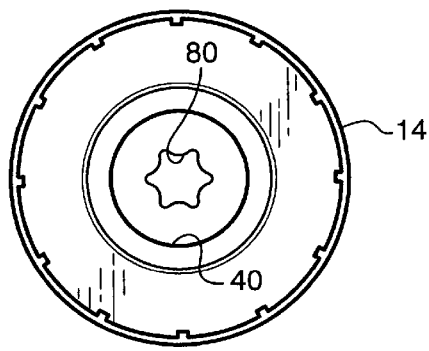
FIG. 35

TOOL DRIVE SYSTEM

CROSS-REFERENCE TO RELATED APPLICATIONS

This application is a continuation-in-part of my prior application Ser. No. 09/317,231, filed May 24, 1999.

BACKGROUND OF THE INVENTION

1. Field of the Invention

The present invention relates to a tool drive system in a chuck assembly where the inner end of the chuck assembly has a cylindrical inner bore portion for being received and fixed on the outer end of a motor shaft of a power tool. The tool drive system includes an insert which is received in the cylindrical bore and held against axial and rotational movement therein. The insert has structure thereon for engaging the inner end of a stem of a tool holder or a of a tool for driving the tool holder or tool. The tool holder or tool is held magnetically or by a mechanical apparatus against axial movement axially of the bore of the chuck.

2. Description of the Prior Art

Heretofore various chuck assemblies have been proposed for driving a tool, such as a drill bit. Typically, such chuck assemblies have utilized radially and axially movable jaws for locking the tool to the chuck assembly.

Examples of previously proposed analogous and non-analogous chuck assemblies and tool holders for chucks are disclosed in the following analogous and non-analogous U.S. patents:

| U.S. Pat. No. | Patentee |
| --- | --- |
| 3,945,653 | Falche |
| 4,188,041 | Soderberg |
| 4,199,160 | Bent |
| 4,692,073 | Martindell |
| 4,900,202 | Wienhold |
| 5,013,194 | Wienhold |
| 5,193,824 | Salpaka |
| 5,417,527 | Wienhold |
| 5,458,445 | Bader et al. |
| 5,464,229 | Salpaka |
| 5,465,983 | Owens et al. |
| 5,470,180 | Jore |
| 5,674,031 | Bilz et al. |
| 5,921,562 | Robison |

In prior application U.S. Ser. No. 09/317,231, there is proposed a snap-in-chuck assembly including a chuck and movable structure in the chuck for releasably engaging in an opening or annular groove in a shank of a tool or tool holder for preventing axial movement of the tool or tool holder and drive structure in the chuck for engaging mating structure on the shank when the shank of the tool or tool holder is inserted in the chuck.

As will be described in greater detail hereinafter, the tool drive system of the present invention can be a stand alone system or can be incorporated into a conventional chuck assembly presently available on the market having jaws which are radially movable inwardly and outwardly of a central chuck bore of the chuck for gripping a tool and which has an inner threaded bore portion adapted to receive a threaded end of a motor shaft of a power tool.

SUMMARY OF THE INVENTION

According to the present invention there is provided a tool drive system for use with a chuck having a throughbore including an outer bore portion for receiving a tool or tool holder and an inner bore portion constructed to receive and be mounted on an outer end of a motor shaft of a power tool. The system comprises: an insert received in the inner bore portion; structure for preventing rotation of the insert relative to the chuck; structure on the insert for engaging an inner end of a tool or tool holder; and a mechanism for holding the tool or tool holder against axial movement relative to the insert.

BRIEF DESCRIPTION OF THE DRAWINGS

FIG. 16 is an exploded perspective view of another embodiment of the tool drive system of the present invention with a threaded insert.

FIG. 17 is a bottom end view of the tool shown in FIG. 16 and is taken along line 17—17 of FIG. 16.

FIG. 18 is an outer end view of the tool holder shown in FIG. 16 and is taken along line 18—18 of FIG. 16.

FIG. 19 is an inner end view of the tool holder shown in FIG. 16 and is taken along line 19≠19 of FIG. 16.

FIG. 20 is an outer end view of the chuck shown in FIG. 16 without an intermediate spline portion and is taken along line 20—20 of FIG. 16.

FIG. 21 is an inner end view of the insert shown in FIG. 16 and is taken along line 21—21 of FIG. 16.

FIG. 22 is an outer end view of the insert shown in FIG. 16 and is taken along line 22—22 of FIG. 16.

FIG. 23 is an exploded view of another embodiment of the tool drive system of the present invention including an insert, a chuck, a tool holder and a tool.

FIG. 24 is a vertical sectional view through the insert shown in FIG. 23.

FIG. 25 is a inner end view of the tool stem shown in FIG. 23 and is taken along line 25—25 of FIG. 23.

FIG. 26 is an outer end view of the tool holder shown in FIG. 23 and is taken along line 26—26 of FIG. 23.

FIG. 27 is an inner end view of the tool holder shown in FIG. 23 and is taken along line 27—27 of FIG. 23.

FIG. 28 is an inner end view of the chuck shown in FIG. 23 and is taken along line 28—28 of FIG. 23.

FIG. 29 is an exploded view of a still further embodiment of the drive system of the present invention including an insert, a chuck, a tool holder and a tool of the present invention.

FIG. 30 is an outer end view of the tool holder shown in FIG. 29 and is taken along line 30—30 of FIG. 29.

FIG. 31 is an end view of a screw having an alan head shown in FIG. 29 and is taken along line 31—31 of FIG. 29.

FIG. 32 is an inner end view of the tool holder shown in FIG. 29 and is taken along line 32—32 of FIG. 29.

FIG. 33 is a lower end view of the insert shown in FIG. 29 and is taken along line 33—33 of FIG. 29.

FIG. 34 is an upper end view of the insert shown in FIG. 29 and is taken along line 34—34 of FIG. 29.

FIG. 35 is a lower end view of the chuck shown in FIG. 29 and is taken along line 35—35 of FIG. 29.

BRIEF DESCRIPTION OF THE PREFERRED EMBODIMENT(S)

Figure 1:
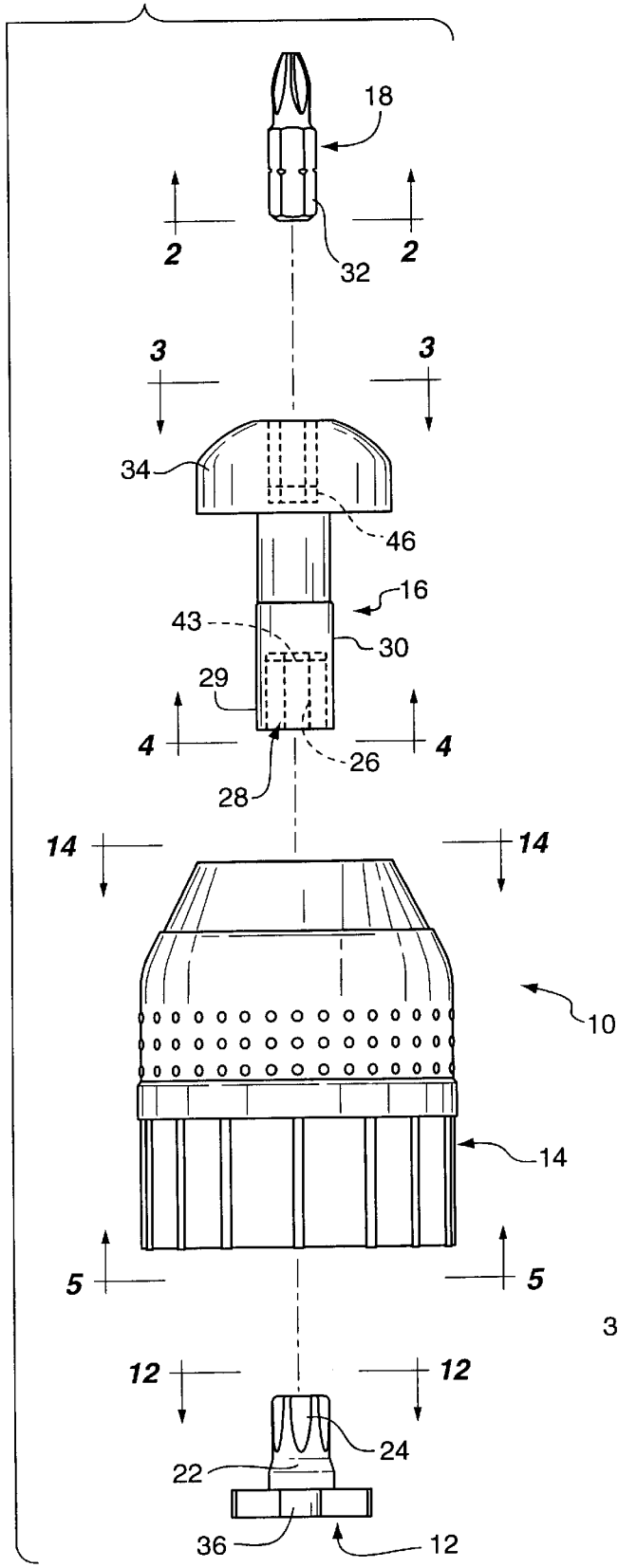
FIG. 1 is a exploded perspective view of one embodiment of the tool drive system of the present invention associated with a chuck and including an insert, the chuck, a tool holder and a tool.
Figure 2:
FIG. 2 is a bottom end view of the tool shown in FIG. 1 and is taken along line 2—2 of FIG. 1.
Figure 3:
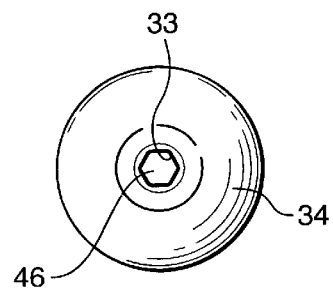
FIG. 3 is an outer end view of the tool holder shown in FIG. 1 and is taken along line 3—3 of FIG. 1.

Referring now to the drawings in greater detail, there is illustrated in FIG. 1 a tool drive system 10 including a drive insert 12, a conventional chuck 14, a tool holder 16 (which can be a tool) and, where the tool holder is utilized, a tool 18 receivable in the tool holder 16. The insert 12 includes a base portion 20 and a projection 22 having structure, such as a spline configuration 24, for engaging mating structure 26 within a cavity 28 at the inner end 29 of a stem 30 of the tool holder 16 (or tool where a tool is inserted directly into the chuck 14 instead of a tool holder 16).

FIGS. 2, 7, 17 and 25 are bottom end views of the tool 18 which has a base or stem 32 with a hex configuration which is received in a hex shaped cavity 33 in an outer, mushroom shaped head or end portion 34 of the tool holder 16 shown, respectively, in FIG's 1, 6, 16, 23 and 29.

FIGS. 3, 8, 18, 26 and 30 are outer end views of the tool holder 16 shown in FIGS. 1, 6, 16, 23 and 29.

Figure 4:
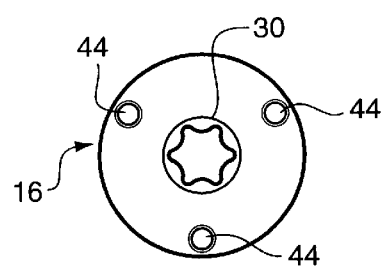
FIG. 4 is an inner end view of the tool holder shown in FIG. 1 and is taken along line 4—4 of FIG. 1.

FIGS. 4 and 19 are inner end views of the tool holder 16 shown, respectively, in FIGS. 1 and 16.

Figure 5:
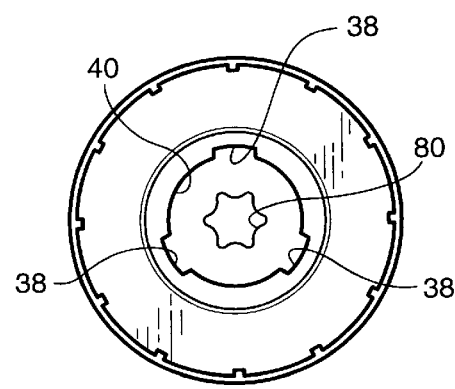
FIG. 5 is an inner end view of the chuck shown in FIG. 1 and is taken along line 5—5 of FIG. 1.

Returning now to FIG's. 1 and 12, it will be seen that the base 20 of the insert 12 has three splines or keys 36, which are adapted to be slidably received in key ways or slots 38 formed in an inner bore portion 40 of the chuck 14, as shown in FIG. 5.

Figure 12:
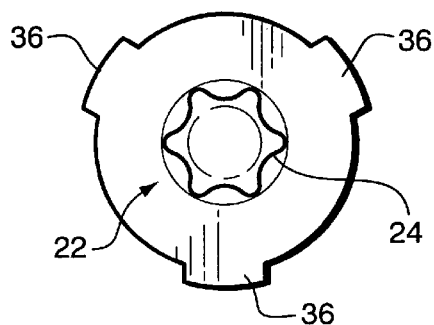
FIG. 12 is an upper end view of the insert shown in FIG. 1 and is taken along line 12—12 of FIG. 1.

A typical construction of the base 20 is shown in FIG. 12 where the three keys, or splines 36 on the outer periphery of the base 20, are illustrated.

In use of the tool drive system 10, shown in FIG. 1, the insert 12 is inserted into the inner bore portion 40 shown in FIG. 5 where the keys or splines 36 are received in the key ways or slots 38. Then, the chuck 14 is screw threaded on a motor shaft of a power tool (not shown). This can be achieved with a tool that is received over the spline configuration 24 on the projection 22 of the insert 18 and then rotated.

Once the chuck 14 and insert 12 are mounted on a threaded outer end of a motor shaft of a power tool, the tool holder 16 can be inserted into an outer bore portion 42 in the chuck 14 with the cavity 28 at the inner end 29 of the stem 30 thereof received over the spline configuration 24 on the projection 22 of the insert 12 to provide a drive connection between the insert 12 and the tool holder 16.

In the embodiment shown in FIGS. 1–5, the tool holder 16 is held to the chuck by magnets 44 positioned on an underside 46 of the mushroom shaped head 34 of the tool holder 16. The tool 18 is held within the head 34 by a magnet 46 located at the bottom of the hex-shaped cavity 33 in an outer side 50 of the head 34 of the tool holder 16, as shown.

With the tool drive system 10 shown in FIGS. 1–5, the three key ways or slots 38 need to be cut into the inner bore portion 40 of a conventional chuck 14. Then, with this modification, the insert 12 can be inserted into the inner bore portion 40 in the chuck 14 and a threaded end of a motor shaft of a power tool is screwed into the inner bore portion 40, which is threaded, to mount the chuck 14, with the insert 12 therein, to a motor shaft of a power tool. See, for example, the chuck assemblies illustrated in the Salpaka U.S. Pat. Nos. 5,193,824 and 5,464,229.

Then, in use, an operator can rotate a portion of the chuck 14 to bring jaws within the chuck 14 into engagement with the shaft or stem 30 of a tool or the tool holder 16 or can simply move a specially configured inner end 29 of a stem or shaft 30 of a tool or of the tool holder 16 into mating engagement with the projection 22 of the drive insert 12. The special configuration comprises a spline or polygonal shaped cavity 28. The tool or the tool holder 16 can be held to the chuck 12 by magnets associated therewith, such as a magnet 43 in the cavity 28 or the magnets 44, thereby to hold the tool or the tool holder 16 against axial movement while the mating spline or polygonal configurations of the projection 22 of the insert 12 and in the cavity 28 of the stem 30 of the tool or tool holder 16 provide a tool drive for driving the tool from the shaft of the power tool.

Referring now to FIG's. 6–10, there is illustrated another embodiment of a tool drive system 60 including a tool or the tool holder 16 with the tool 18, the tool holder 16 having a mushroom shaped head 34 with a cavity 33 and a stem, shaft or shank 30 extending from the head 34 to a lower, inner free end 62 which has a spline or polygonal shape 64, a chuck 14 and a rive insert 66. The drive insert 66 includes a base portion 68 with three keys or splines 70 on the outer periphery thereof and a cavity 72 therein which has a configuration 74 FIG. 11 that mates with the spline or polygonal configuration 64 at the inner end 62 of the stem 30 of the tool holder 16. It will be understood that a tool with a lower inner end having a spline of polygonal configuration constructed to mate with the configuration 74 in cavity 72 of the drive insert 66 can be provided in place of the tool holder 16 and tool 18.

Figure 6:
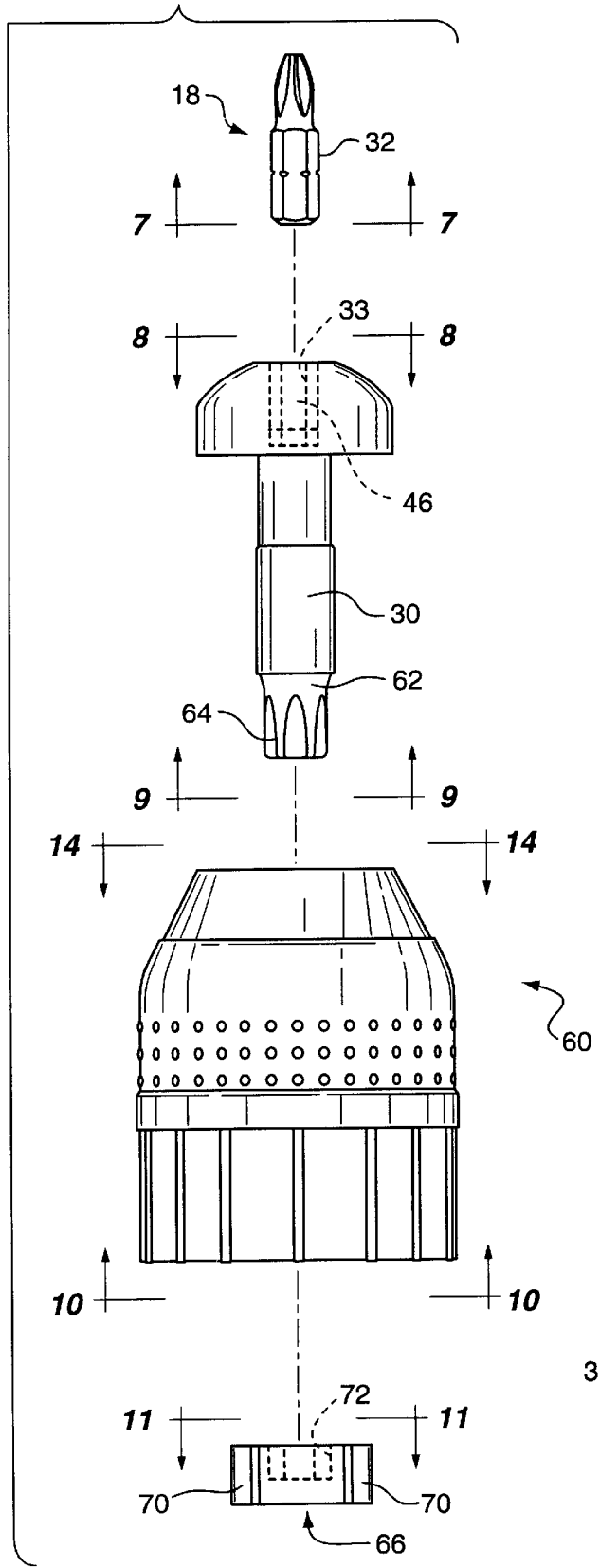
FIG. 6 is an exploded view of another embodiment of a tool drive system of the present invention and includes an insert, a chuck, a tool holder and a tool.
Figure 7:
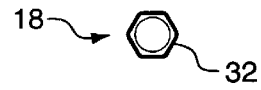
FIG. 7 is a bottom end view of the tool shown in FIG. 6 and is taken along line 7—7 of FIG. 6.
Figure 8:
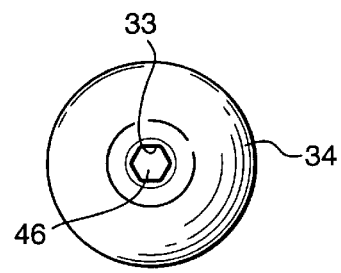
FIG. 8 is an outer end view of the tool holder shown in FIG. 6 and is taken along line 8—8 of FIG. 6.
Figure 9:
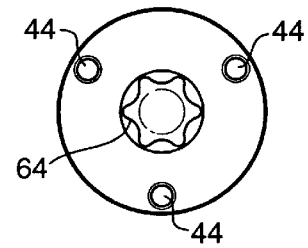
FIG. 9 is an inner end view of the tool holder shown in FIG. 6 and is taken along line 9—9 of FIG. 6.
Figure 10:
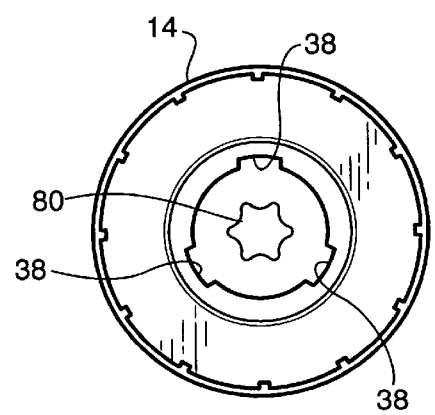
FIG. 10 is an inner end view of the chuck shown in FIG. 6 and is taken along line 5—5 of FIG. 6.

The inner bore portion 40 of the throughbore of the chuck 14 shown in FIG. 10 has the same configuration as shown in FIG. 5 and is adapted to receive the insert 66 shown in FIG. 6. In this way, a drive connection from the threaded end of a motor shaft to the chuck 14 and the drive insert 66 can be transmitted to the inner end 62 of the tool holder 16 or to the inner end of a tool which is configured and shaped for being received in the cavity 72 in the insert 66.

Figure 11:
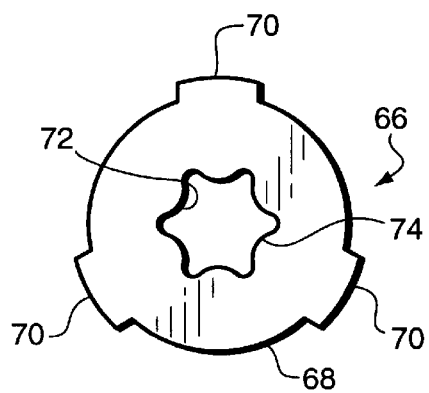
FIG. 11 is an upper end view of the insert shown in FIG. 6 and is taken along line 11—11 of FIG. 6

FIG. 11 is a top end view of the drive insert 66 shown in FIG. 6 and FIG. 12 is a top end view of the drive insert 12 shown in FIG. 1.

Figure 13:
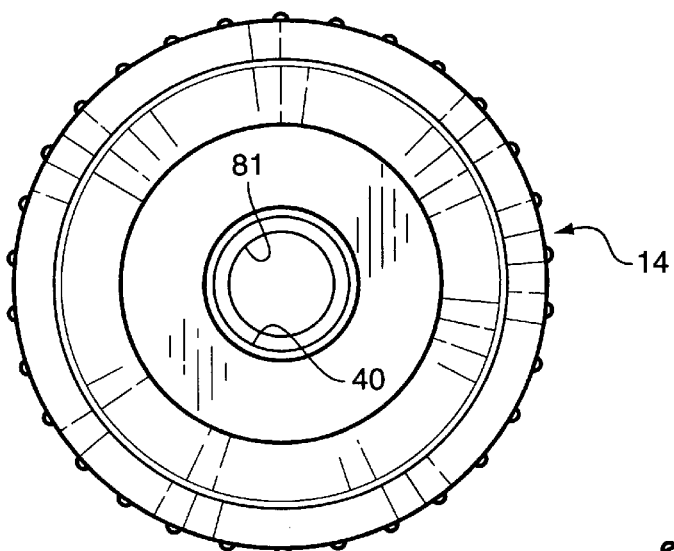
FIG. 13 is an outer end view of the chuck shown in FIG. 16 and shows no intermediate spline portion at the upper end of the inner bore portion.
Figure 14:
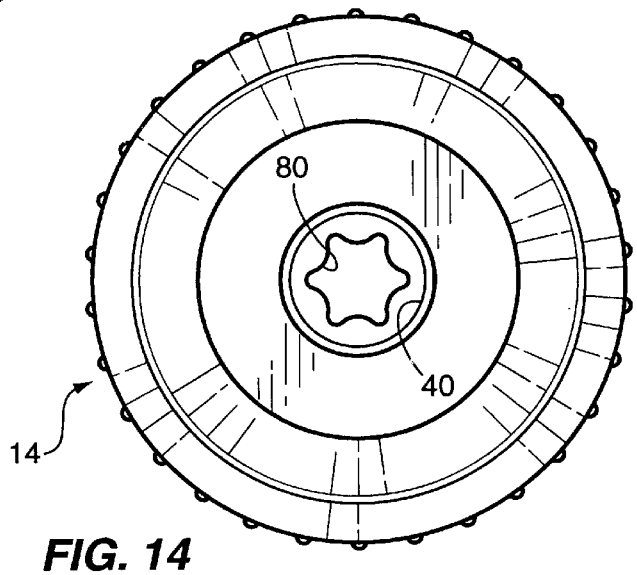
FIG. 14 is an outer end view of the chuck shown in FIG's. 1 and 6 with a spline configuration at the upper end of the inner bore portion and is taken along line 14—14 of FIG's. 1 and 6.

FIG. 13 is an end view of the lower end of the chuck 14 shown in FIG. 16 without an intermediate spline bore portion 80 and FIG. 14 is an end view of the outer end of the chuck 14 shown in FIG.'s. 1 and 6.

Figure 15:
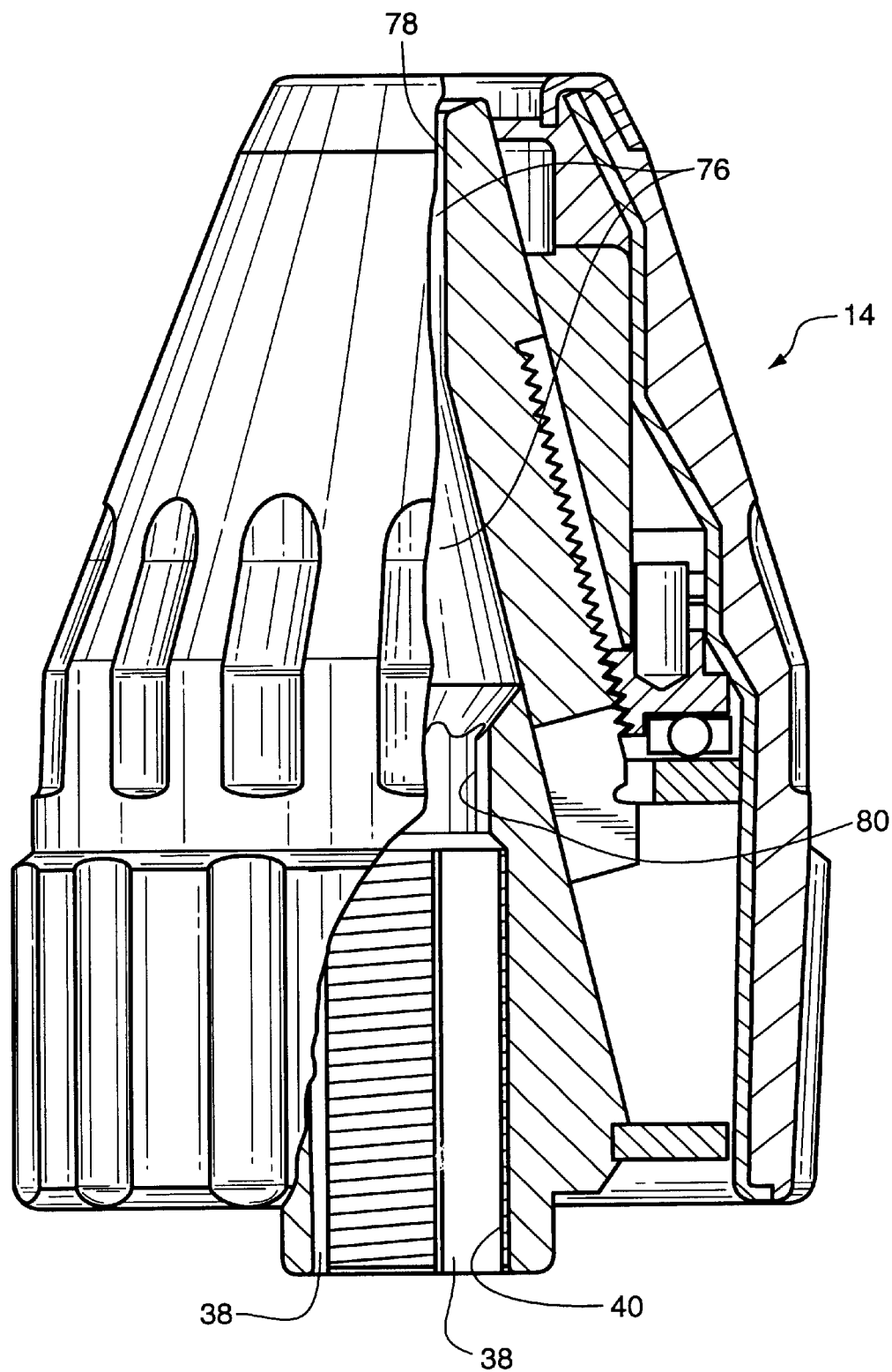
FIG. 15 is an enlarged view of a chuck with portions broken away to show the threaded inner bore portion and an intermediate spline portion at the upper end of the inner bore portion.

FIG. 15 is an enlarged view of a conventional chuck 14 showing a throughbore 76 through the chuck 14, a jaw 78 movable into the throughbore 76, a intermediate spline bore portion 80 of the throughbore 76 for receiving a special tool for mounting the chuck 14 on the threaded end of a motor shaft of a power tool and a threaded inner bore portion 40 of the throughbore 76. Also shown is a key way 38 formed in the threaded inner bore portion 40.

FIG. 16 is an exploded view of another embodiment of a tool drive system 90 of the present invention similar to the tool drive system 10 shown in FIG. 1. Here, the tool drive system 90 is shown to include a drive insert 92, a chuck 14, a tool holder 16 and a tool 18. The end views shown in FIG'S. 17, 18 and 19 correspond to the end views shown in FIGS. 2, 3 and 4. In this tool drive system 90, no key ways are formed in the threaded inner bore portion 40, as shown in FIG's. 16 and 20 and in this embodiment, the drive insert 92 has a threaded cylindrical base portion 94 and a projection 96, corresponding to the projection 22 shown in FIG. 1.

In this embodiment of the tool drive system 90, the insert 92 is threaded into the inner threaded bore portion 40 until it bottoms out and is locked in place after which the chuck 14 is threadably mounted on a threaded motor shaft of a power tool, such as with a socket tool (not shown) which is inserted through the throughbore 76 of the chuck 14 for engaging the projection 96. Then, the tool holder 16 can be held to the chuck 14 by the magnets 44, shown in FIG. 19. The tool holder 16 is then rotatably driven by the engagement of the splined or polygonal shaped projection 96 in the cavity 28 in the inner end 29 of the stem, shaft or shank 30 of the tool holder 14.

FIG. 23 is an exploded view of still another embodiment of a tool drive system 100 of the present invention. Here, a tool holder 16 is provided which has a square-in-cross-section cavity 102 in the inner end 104 of the shank 30 of the tool holder 16 for receiving a square-in-cross section projection 106 of a drive insert 108. The insert 108 is similar to the insert 12 shown in FIG. 1, except that the square-in-cross-section projection 106 has a spring biased detent 110 mounted in a transverse slot 112 in the projection 106 as shown in FIG. 24. The insert also has a base 112 having three splines or keys 114 for being received in mating key ways 116 formed in the inner bore portion 40 of the throughbore 76 in the chuck 14.

In this embodiment of the tool drive system 100, the spring biased detent 110 provides a mechanical mechanism for holding the tool holder 16, or a tool having a cavity at an inner end thereof, from moving axially relative to the chuck 14. The tool holder 16 or tool with a cavity at the inner end thereof has to be forcibly pulled away from the chuck 14 to insert another tool in the chuck 14.

In this embodiment, the spring biased detent 110 is used in place of magnets 44 for holding the tool holder 16 or a similarly configured tool from moving axially relative to the chuck 14.

FIG. 29 illustrates still another embodiment of a tool drive system 120 constructed according to the teachings of the present invention. This tool drive system 120 utilizes the tool holder 16 shown in FIG. 6. This tool holder 16 has magnets 44 on the underside 46 of the mushroom shaped head 34 and a stem or shaft 30 with an inner end 62 having a spline or polygonal configuration 64.

In this embodiment, a drive insert 122 is inserted into the throughbore 76 of the chuck 14 from the upper end of the chuck 14. The insert 122 has an upper base portion 124 with a splined or polygonal cavity 126 therein and a depending projection 128 which has a spline configuration that is received in the intermediate spline bore portion shown in FIG. 15 for establishing a drive connection from the chuck 14 to the insert 122 and then from the cavity 126 in the upper base portion 124 of the insert 122 to the splined or polygonal inner end 62 of the stem or shaft 30 of the tool holder 16.

It is to be understood that such drive can be from the cavity 126 to a specially configured inner end of a tool adapted to be received in the cavity 126.

In this embodiment, a throughbore 128 is provided through the depending projection 128 and opens into the cavity 126 so that a retainer screw 130 having an Alan head 132, as shown in FIG. 31, can be inserted through the insert 122 and threaded into an axially threaded bore in the threaded end of the motor shaft of the power tool.

A preferred embodiment of the tool drive system of the present invention includes an insert, such as the insert 92 shown in FIG. 16, which is threadably received into the inner threaded bore portion 40 of the throughbore 76 in the chuck 14 so that the tool drive system does not require any modification to the chuck 14. Furthermore, the chuck can be of the type shown in FIG. 15 with an intermediate spline bore portion 80 above the inner threaded bore portion 40 or a chuck without an intermediate spline bore portion 80. Furthermore, such insert can utilize the projection shown in FIGS. 23 and 24 having a spring biased detent 110 for being received in a similarly shaped cavity at the inner end of a tool or a tool holder 16 for snap-fittingly locking the tool or tool holder 16 against axial movement relative to the chuck without magnets 44, except when the tool or tool holder 16 is forcibly pulled outwardly from the chuck 14. The embodiment just described has a mechanical holding structure instead of a magnetic holding structure for holding the tool or tool holder to the projection of the insert received in the chuck.

From the foregoing descriptions, it will be understood that the tool drive system of the present invention in its various embodiments has a number of advantages, some of which have been described above and others of which are inherent in the invention. Additionally, it will be noted that modifications can be made to the tool drive systems of the present invention without departing from the teachings of the present invention. Accordingly, the scope of the invention is only to be limited as necessitated by the accompanying claims.

I claim:

1. A tool drive system for use with a chuck having jaws and a throughbore including an outer bore portion for receiving a tool or tool holder and an inner bore portion constructed to receive and be mounted on an outer end of a motor shaft of a power tool, said system comprising: an insert received in the inner bore portion; means for preventing rotation of said insert relative to said chuck; drive structure, on or in said insert for engaging an inner end of a tool or tool holder; and, means, other than the jaws, for inhibiting or holding the tool or tool holder from axial movement relative to said insert.

2. The tool drive system of claim 1 wherein said tool or tool holder has an inner stem portion with a cavity therein and said insert has a projection adapted to be received in the cavity and the cavity and said projection having mating engaging structure whereby a rotating drive force can be imparted from said projection of the insert to the tool or tool holder.

3. The tool drive system of claim 1 wherein said insert has a cavity and an inner end of a stem portion of the tool or tool holder has a projection adapted to be received in said cavity and said cavity and projection having mating engaging structure whereby the insert can impart a rotating drive force to the stem of the tool or tool holder.

4. The tool drive system of claim 1 wherein said means for locking said insert against rotation relative to said chuck includes at least one key way in the inner bore portion and at least one key or spline on said insert and receivable in said key way.

5. The tool drive system of claim 1 wherein said insert is generally cylindrical and has a threaded outer surface adapted to mate with and be threaded in a threaded inner bore portion of the throughbore in the chuck and the threaded connection between said insert and said inner bore portion defining said means for preventing rotation of said insert relative to the chuck.

6. The tool drive system of claim 1 wherein the throughbore in the chuck has, above the inner bore portion, an intermediate bore portion having a special configuration and said insert has a depending projection having a mating configuration for being received in and locked in the intermediate portion against rotation relative to the throughbore and said insert having an upper base portion with a cavity therein and the inner end of the tool or tool holder has a downwardly extending projection which is received in said cavity and said cavity and the depending projection having a mating configuration for providing a rotational drive connection between said insert and the inner end of the tool or tool holder.

7. The tool drive system of claim 1 wherein one of the inner end of the tool or tool holder and said drive structure on or in said insert has a cavity and the other of said drive structure on or in said insert and the inner end of the tool or tool holder has a projection which is received in said cavity and said cavity and said projection having mating structure for establishing a rotary drive between said insert and the inner of the tool or tool holder.

8. The tool drive system of claim 7 wherein said means for inhibiting or holding the tool or tool holder from axial movement relative to said insert includes magnetic means associated with one of said projection and said cavity.

9. The tool drive system of claim 7 wherein said means for inhibiting or holding the tool or holder from axial movement relative to said insert comprising a recess or pocket in a wall of said cavity and a spring biased detent mounted in a side of said projection for mechanically and snap-fittingly engaging in said pocket or recess in said side wall of said cavity.

10. The tool drive system of claim 1 wherein the throughbore has a transition area between the outer bore portion and the inner bore portion and the chuck has a front end and a back end, said drive structure of said insert being located in or just above the transition area with said insert being inserted from the back end of the chuck into the inner bore portion before the mounting of the outer end of a motor shaft therein and being held in the inner bore portion between the transition area and the outer end of the motor shaft, the drive structure on the inner end of the tool or tool holder being inserted into the throughbore a sufficient distance so as to engage said drive structure on or in said insert.

11. The tool drive system of claim 10 wherein said inner bore portion is threaded, said insert has a base which is threaded and which is threadably received in the inner bore portion and the outer end of the motor shaft is also threaded so that the motor shaft can be threaded into the inner bore portion against said insert.

12. The tool drive system of claim 10 wherein the inner bore portion has a key way and the insert has a base with a key extending laterally therefrom for being received in the key way, the key and key way defining said means for preventing rotation of said insert relative to the chuck.

13. A tool drive system for use with a chuck having a throughbore including an outer bore portion for receiving a tool or tool holder and an inner bore portion constructed to receive and be mounted on an outer end of a motor shaft of a power tool, said system comprising: an insert received in the inner bore portion; means for preventing rotation of said insert relative to said chuck; drive structure on said insert for engaging an inner end of a tool or tool holder; and means for inhibiting or holding the tool or tool holder from axial movement relative to said insert, said means for holding or inhibiting said tool or tool holder from axial movement relative to the chuck comprising magnetic means associated with said tool or tool holder for magnetically holding the tool or tool holder to the chuck.

14. A tool drive system for use with a chuck having a throughbore including an outer bore portion for receiving a tool or tool holder and an inner bore portion constructed to receive and be mounted on an outer end of a motor shaft of a power tool, said system comprising: an insert received in the inner bore portion; means for preventing rotation of said insert relative to said chuck; drive structure on said insert for engaging an inner end of a tool or tool holder; and, means for inhibiting or holding the tool or tool holder from axial movement relative to said insert said insert having a projection extending upwardly therefrom, said projection having a configuration adapted to mate with a mating configuration in a cavity at the inner end of the tool or tool holder, and said projection having a spring biased detent for mechanically and snap-fittingly engaging in a pocket or recess in the cavity for releasably holding or inhibiting the tool or tool holder from axial movement, said spring biased detent and pocket or recess defining said means for holding or inhibiting the tool or tool holder from axial movement relative to the chuck.

15. A tool drive system for use with a chuck having a throughbore including an outer bore portion for receiving a tool or tool holder and an inner bore portion constructed to receive and be mounted on an outer end of a motor shaft of a power tool, said system comprising: an insert received in the inner bore portion; means for preventing rotation of said insert relative to said chuck; drive structure on said insert for engaging an inner end of a tool or tool holder; and, means for inhibiting or holding the tool or tool holder from axial movement relative to said insert, the throughbore in the chuck having, above the inner bore portion, a transition area including an intermediate bore portion having a special configuration and said insert has a depending projection having a mating configuration for being received in and locked in the intermediate bore portion against rotation relative to the throughbore and said insert having an upper base portion with a cavity therein and the inner end of the tool or tool holder has a downwardly extending projection which is received in said cavity and said cavity and the depending protection having a mating configuration for providing a rotational drive connection between said insert and the inner end of the tool or tool holder, said insert having a passageway extending from the bottom of said cavity through said depending projection, the outer end of a motor shaft being received in the inner bore portion of the chuck and having a threaded bore and said tool drive system including a screw which is received through said passageway and threadedly received in the threaded bore in the outer end of the motor shaft.

* * * * *